(12) United States Patent
Vera et al.

(10) Patent No.: US 9,279,469 B2
(45) Date of Patent: Mar. 8, 2016

(54) DELAY MECHANISM OF A MAIN ROD OF A GAS SPRING

(75) Inventors: Felix Javier Estirado Vera, Vitoria (ES); Oscar Alejos Perez, Vitoria (ES)

(73) Assignee: Azol-Gas, S.L., Vitoria (Alava) (ES)

( * ) Notice: Subject to any disclaimer, the term of this patent is extended or adjusted under 35 U.S.C. 154(b) by 345 days.

(21) Appl. No.: 13/882,235

(22) PCT Filed: Aug. 10, 2011

(86) PCT No.: PCT/ES2011/070594
§ 371 (c)(1),
(2), (4) Date: May 21, 2013

(87) PCT Pub. No.: WO2012/056066
PCT Pub. Date: May 3, 2012

(65) Prior Publication Data
US 2013/0269513 A1    Oct. 17, 2013

(30) Foreign Application Priority Data

Oct. 29, 2010    (ES) .................................. 201031601

(51) Int. Cl.
*F16F 9/02*    (2006.01)
(52) U.S. Cl.
CPC ................. *F16F 9/02* (2013.01); *F16F 9/0236* (2013.01)

(58) Field of Classification Search
CPC ......... F16F 9/0236; F16F 9/0227; F16F 9/02; F15B 11/046; F15B 11/048; F15B 11/0406
See application file for complete search history.

(56) References Cited

U.S. PATENT DOCUMENTS 5,275,387 A * 1/1994 Cotter et al. ............... 267/64.11

FOREIGN PATENT DOCUMENTS

| DE | 10024499 A1 | * 11/2001 |
| EP | 1186795 A2 | 3/2002 |
| EP | 1241373 A1 | 9/2002 |
| EP | 1555453 A1 | * 7/2005 |
| EP | 1598124 A1 | 11/2005 |
| EP | 1653116 A2 | * 5/2006 |
| WO | 9015267 A1 | 12/1990 |

* cited by examiner

*Primary Examiner* — Nathaniel Wiehe
*Assistant Examiner* — Abiy Teka
(74) *Attorney, Agent, or Firm* — Hayes Soloway PC

(57) ABSTRACT

A delay mechanism of a main rod of a gas spring is described, having an inner rod and a series of gas chambers which are defined in the interior of the body of the spring in such a manner that, by controlling the passage of gas between said chambers, the speed and delay of the main rod of the spring is controlled.

7 Claims, 1 Drawing Sheet

DELAY MECHANISM OF A MAIN ROD OF A GAS SPRING

OBJECT OF THE INVENTION

The present invention belongs to the field of stamping manufacturing systems.

The object of the invention consists of a mechanism for increasing production and decreasing the time required to manufacture parts by means of stamping by controlling the working speed of the die elements.

BACKGROUND OF THE INVENTION

For some time now, gas springs have been used as an elastic force-limiting element in sheet metal stamping processes.

Manufacturer requirements, both for producing more parts in the same amount of time and for producing more complex parts, have led to the control and increase of working speeds of all the die elements, including those of gas springs.

The need to control the speed of the elements, tools and machines used to obtain the final part is becoming increasingly frequent among stamped part manufacturers, due to the increased complexity thereof. Advances in presses allow speeds at each point to be governed as required for each type of part. Also in accordance with the design thereof, the gas spring rod must not return solidarily to the press, but must rather be delayed and said delay be controlled. In this manner, it is possible to form a part in a smaller number of stages, due to being able to withdraw said part without being damaged by the elements associated to the gas spring rods which have allowed deformation thereof.

Gas spring delay systems allow the rod to recover its position within a certain time period, longer than it takes for the press to return to its original position, at constant speed, once the press withdrawal process has started. Additionally, start of recovery can even be delayed by keeping the rod completely stopped (WO90/15267) and subsequently returning at constant speed.

DESCRIPTION OF THE INVENTION

The variable speed delay system with withdrawal allows a delay control which is crucial in the first part of the withdrawal, as once part of the path travelled has been recovered it can return to the starting position more quickly, which would allow an increase in the number of parts to be produced within the same time period, i.e. an increase in productivity. The purpose of the invention is to allow said increase in productivity by ensuring that said rod does not return at constant speed, but rather ensuring that the final part of the withdrawal is faster.

The invention consists of fixing an inner rod to the base of the spring, having a height such that the closure gasket disposed inside the piston is only in contact with said inner rod along a travel path shorter than the travel path of the cylinder. A throttle element is disposed inside the hollow inner rod upon passage of the gas, the so-called first passage, wherein a gas shut-off valve controllable from the exterior can also be housed.

When the main rod is in the position corresponding to that of the compressed spring, three chambers are created wherein the gas is housed. A first chamber is formed by the volume comprised between the body, the lower face of the piston and the inner rod; a second chamber corresponds to the evacuation volume of the main rod limited by the upper face of the inner rod; and a third chamber is formed by the volume comprised between the body, the outer lateral face of the main rod and the upper face of the piston. This third chamber is connected to the second chamber by the second passage, which is one or more orifices made radially in the rod.

The first passage is disposed in the interior of the inner rod, which is the connection between the first and second chamber, by inserting a throttling governor, which can be interchangeable, defined by a lid having a very small orifice that is fixed to the inner rod. In order to isolate the chambers therebetween and force the passage of the gas through the passages, two gaskets are disposed upon passage of the gas, an outer gasket that closes against the inner rod and another, inner gasket that closes against the inner rod, as well as anti-spillback valves which only allow passage of the gas therethrough when the rod passes from its extended position to the position corresponding to the compressed spring.

The gas, along its path of travel when the spring recovers its rest position, must pass from the third chamber to the second chamber, and from there to the first chamber. The speed of recovery of the rod to its extended position depends mainly on the differences in pressure between chambers 1 and 3, in such a manner that the greater the difference, the slower it will ascend. By controlling gas passage speed we can control the different pressures between the chambers, said speed control being regulated by the gas passage cross-section between the different chambers. The passage cross-section of the first passage must be smaller than the passage cross-section of the second passage, due to which the second speed is greater than the first.

The throttle element of the inner rod lid controls the first, slower, ascent speed of the main rod through the first passage. In the event of having a shut-off valve, it will direct the gas through the first passage on receiving the aperture signal.

Once the main rod has recovered part of its travel path, in such a manner that it ascends sufficiently for the inner closure gasket of the piston to stop fulfilling its function on exceeding the height of the inner rod, it allows the first chamber and second chamber to be freely connected therebetween and, as of that point, the recovery speed of the main rod is controlled by the throttle element of the second passage.

Both the first ascent speed and second ascent speed are determined by dimensioning the section of the aforementioned first and second passages, respectively, and the moment in which the change from one speed to another takes place during recovery of the main rod is determined by the length of the inner rod.

DESCRIPTION OF THE DRAWINGS

In order to complement the description being made and with the object of helping to better understand the characteristics of the invention, according to a preferred example of practical embodiment thereof, a set of drawings has been included as an integral part of said description, wherein the following has been represented in an illustrative and non-limiting manner.

PREFERRED EMBODIMENT OF THE INVENTION

In light of the figures, a preferred example of embodiment of the delay mechanism of the main rod (1) of a gas spring object of this invention is described below.

Figure 1:
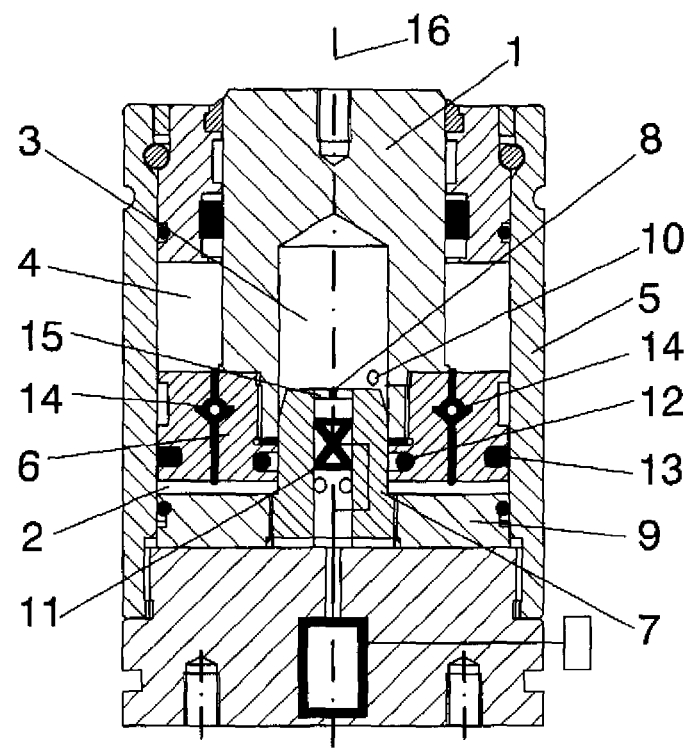
FIG. 1 shows a cross-sectional view of the mechanism object of the invention in the compressed spring position.
Figure 2:
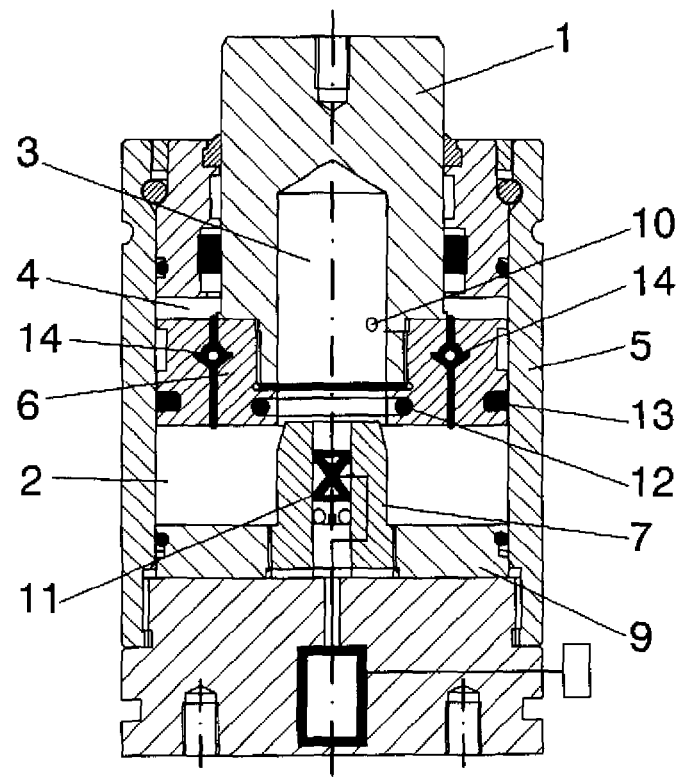
FIG. 2 shows a cross-sectional view of the mechanism object of the invention in the extended position.

When the main rod (1) that is inside a body (5), defined by a hollow solid of revolution, is in a position corresponding to the compressed spring, a first chamber (2), a second chamber (3) and a third chamber (4) are defined in said body (5) wherein the gas is housed. The first chamber (2) is formed by the volume comprised between the body (5), the lower face of a piston (6) and an inner rod (7) fixed to a base (9) of the spring. The second chamber (3) corresponds to the evacuation volume of the main rod (1) limited by the upper face of the inner rod (7). A first passage (8) is disposed in the interior of the inner rod (7), which interconnects the chambers (2, 3) by inserting an interchangeable throttling governor, which is a lid with a very small orifice fixed to the inner rod (7); additionally, a shut-off valve (11) controlled from the exterior can be installed in the interior of said inner rod (7). The third chamber (4) is formed by the volume comprised between the body (5), the outer lateral face of the main rod (1) and the upper face of the piston (6). This third chamber (4) is connected to the second chamber (3) by a second passage (10) which is defined by one or more orifices made radially in the main rod (1). In order to isolate the chambers (2, 3) therebetween and force the passage of the gas through the passages (8, 10), seals (12, 13) are disposed in the piston (6) upon passage of the gas, i.e. an outer gasket (13) which closes against the body (5) and an inner gasket (12) which closes against the inner rod (7), in addition to anti-spillback valves (14) which only allow passage of gas therethrough when the main rod (1) passes from an extended position (see FIG. 2) to a position corresponding to the compressed spring as observed in FIG. 1.

The gas, along its path of travel on recovering the spring its rest position, must pass from the third chamber (4) to the second chamber (3) and from there to the first chamber (2). The speed of recovery of the main rod (1) to its extended position depends mainly on the differences in pressure between the first chamber (2) and the third chamber (4), in such a manner that the greater the difference, the slower it will ascend. By controlling gas passage speed, the difference in pressures between the chambers (2, 3, 4) is controlled. Speed control is regulated by the gas passage cross-section between the chambers (2, 3, 4). The passage cross-section of the first passage (8) must be smaller than the passage cross-section of the second passage (10), which is defined by one or more holes drilled into the wall of the main rod (1) perpendicular to the revolution axis (16) of said main rod (1), due to which the second speed is faster than the first.

The throttle part of a lid (15) disposed at the access mouth to the inner rod (7) controls the first, slower, ascent speed of the main rod (1) through the first passage (8). In the embodiment wherein the shut-off valve (11) is disposed, said valve directs the gas through the first passage (8) upon receiving an aperture signal.

Once the main rod (1) has recovered part of its path of travel, in such a manner that it ascends sufficiently for at least one inner gasket (12) of the piston (6) to stop fulfilling its function on exceeding the height of the inner rod (7), it allows the first and second chambers (2, 3) to be freely connected therebetween and, as of that point, the recovery speed of the main rod (1) to be controlled by the throttle element of the second passage (10).

The invention claimed is:

1. A delay mechanism of a main rod of a gas spring comprising a body defined by a hollow solid of revolution, in the interior whereof the following are coaxially disposed:
    a base of the spring disposed on a lower part of the body;
    a main rod being partially hollow and having a smaller cross-section than the body; and
    a piston solidarily connected to the main rod, wherein the main rod and the piston are both adapted for moving linearly along the interior of said body, the delay mechanism additionally comprising:
    a hollow inner rod disposed in the interior of the body fixed to the base;
    at least one first chamber defined between an inner wall of the body, a lower face of the piston and the inner rod;
    at least one second chamber defined in a hollow interior of the main rod limited on its lower part by the upper face of the lower rod;
    at least one third chamber defined by the inner wall of the body, the outer wall of the main rod and the upper face of the piston;
    a first passage defined in an interior of the inner rod destined for controlling the passage of gas from the first chamber to the second chamber;
wherein the delay mechanism further comprises:
    at least one second passage defined in the wall of the main rod destined for controlling the passage of gas from the third chamber to the second chamber,
    at least one inner gasket disposed between the inner wall of the piston and the outer wall of the inner rod,
and wherein:
    the piston has the same cross cross-section as that of the interior of the body (5),
    the diameter of the first passage (8) is smaller than the diameter of the second passage (10), and
    the inner rod (7) has a height configured such that the inner gasket (12) is only in contact with said inner rod (7) along a travel path which is shorter than the travel path of the body (5) such that when the inner gasket (12) is not in contact with the inner rod (7) the first (2) and second (3) chamber are freely connected and the recovery speed of the main rod (1) is controlled by the second passage (10).

2. The delay mechanism of claim 1, wherein the first passage is a throttle element defined by a perforated lid fixed to an access mouth of the interior of the inner rod.

3. The delay mechanism of claim 1, wherein the second passage is defined by at least one drill hole made in the wall of the main rod perpendicular to the revolution axis of said main rod.

4. The delay mechanism of claim 1, further comprising at least one shut-off valve, disposed in the interior of the inner rod and positioned anterior to the first passage, destined for controlling the passage of gas through said first passage.

5. The delay mechanism of claim 4, wherein the shut-off valve is adapted so as to allow control thereof from the exterior of the body.

6. The delay mechanism of claim 1, further comprising at least one outer gasket disposed between the outer wall of the piston and the inner wall of the body.

7. The delay mechanism of claim 1, wherein it comprises at least one anti-spillback valve disposed in the interior of the piston, destined for allowing the passage of gas therethrough when the main rod passes from an extended position to a return position corresponding to a compressed spring.

* * * * *